United States Patent
Harth, III

(10) Patent No.: US 7,275,589 B2
(45) Date of Patent: Oct. 2, 2007

(54) ANTI-VIBRATION BARS FOR BOILER TUBES WITH PROTECTIVE SHIELDS

(75) Inventor: George H. Harth, III, Wadsworth, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 687 days.

(21) Appl. No.: 10/802,688

(22) Filed: Mar. 17, 2004

(65) Prior Publication Data

US 2006/0016402 A1    Jan. 26, 2006

(51) Int. Cl.
    *F28F 19/00*    (2006.01)
(52) U.S. Cl. ..................... 165/134.1; 165/69
(58) Field of Classification Search ........... 165/69, 165/95, 162, 172, 134.1; 248/68.1; 138/106, 138/107, 112, 115–117
    See application file for complete search history.

(56) References Cited

U.S. PATENT DOCUMENTS

| | | | | |
|---|---|---|---|---|
| 3,530,899 A | * | 9/1970 | Breeding | 138/107 |
| 4,168,737 A | * | 9/1979 | Yoshimitsu | 165/134.1 |
| 4,619,314 A | * | 10/1986 | Shimoda | 165/134.1 |
| 4,951,902 A | * | 8/1990 | Hardtke | 248/74.1 |
| 5,094,292 A | * | 3/1992 | Buckshaw | 165/134.1 |
| 6,006,702 A | * | 12/1999 | Harth et al. | 122/511 |
| 6,065,532 A | * | 5/2000 | Brownlee | 165/134.1 |

* cited by examiner

*Primary Examiner*—Teresa J. Walberg
(74) *Attorney, Agent, or Firm*—Michael J. Seymour; Eric Marich

(57) ABSTRACT

A bank of horizontally oriented boiler tubes which are periodically exposed to the abrasive action of a stream of blowing fluid cleaning medium. Portions of the boiler tubes, located at the top of the bank, are provided with spaced shields for protection from the fluid cleaning medium. An anti-vibration bar extends vertically between the protective shields to suppress vibration of the boiler tubes. A cap is fitted over the top end of the anti-vibration bar. The cap is sized to overlap adjacent portions of the protective shields thereby covering any gaps between the anti-vibration bar and the shields that would expose the boiler tubes to the action of the fluid cleaning medium.

7 Claims, 2 Drawing Sheets

ANTI-VIBRATION BARS FOR BOILER TUBES WITH PROTECTIVE SHIELDS

FIELD AND BACKGROUND INVENTION

The present invention relates, in general, to a bank of horizontal boiler tubes fitted with shields for protection from sootblower erosion, and to a structural framework used to dampen or suppress vibration of the horizontal boiler tubes. More particularly, it relates to an anti-vibration bar which is structured to cooperate with the tube shields in order to protect the horizontal boiler tubes from sootblower erosion.

DESCRIPTION OF THE RELATED ART

It is common practice in the design of modern high capacity boilers to provide heat exchange surfaces in the form of closely spaced elongated tubes positioned in passages through which combustion gases of relatively high velocity are conveyed. The heat exchange surfaces are of the type having at least one bank of tube rows spaced across the gas stream in side-by side relationship, with each row being formed of substantially coplanar return bend tube portions spaced in the direction of flow of the combustion gas stream, and of relatively long coplanar horizontal tube portions spaced in parallel rows distributed transversely of the combustion gas stream. These heat exchange surfaces are located in the boiler furnace and the convection pass, and are referred to in the industry as superheaters, reheaters, and economizers whose respective inlet and outlet headers and major supports are housed in a section referred to in the industry as the vestibule, the latter being situated beside the furnace and convection pass roof line. The horizontal loops of these heat exchange surfaces are supported by vertical structural supports and are subjected to stresses due to differences in expansion between the different loops since their average temperatures are different since the fluid flowing through the tubes from the inlet to the outlet headers is being heated. In large scale boilers, the horizontal portions of the tubes are relatively long, for example thirty feet in length. To maximize the heat transfer, the tubes are generally bundled closely to one another. The increase in temperature and velocity of the fluid flowing through the tubes, and the flow of relatively high velocity combustion gases over the tubes causes the relatively long horizontal tube portions, hereinafter referred to interchangeably as horizontal boiler tubes or boiler tubes, to experience flow induced vibrations which, if left unrestricted, can result in excessive mechanical wear. Therefore, it is desirable and necessary to provide structural frameworks such as anti-vibration bars to dampen or suppress tube vibration.

The combustion of coal and other fossil fuels during the operation of boilers for steam generation in utility and industrial power plants produces deposits such as soot, ash, and slag that accumulate on the fireside tubular heat exchange surfaces. The accumulation of such deposits will dramatically decrease the efficiency of the boilers by greatly reducing the amount of heat transferred from the combustion gases to the fluid flowing through the tubular heat exchange surfaces. In order to maintain peak efficiency, it is necessary to periodically clean these deposits to eliminate their insulating effect, and thus insure maximum heat conduction between the combustion gases and the tubular heat exchange surfaces.

The cleaning of highly heated surfaces, such as the tubular heat exchange surfaces found in the furnace and convection pass of boilers has been commonly performed by devices known in the industry as sootblowers. Typically, these sootblowers are permanently installed between tube banks to permit periodic cleaning of deposits of particulate matter on the fireside of the heat exchange surfaces. Accordingly, in large utility power plant boilers it is not uncommon to have fifty or more sootblowers in conjunction with each boiler. These sootblowers provide periodic cleaning of the tubular heat exchange surfaces through programmed cleaning cycles to remove accumulated deposits of soot, ash, and slag from the fireside surfaces of the heat exchanger tubes, and thus maintain the efficiency of the operating boiler. Generally, a sootblower includes a retractable elongated lance tube that is periodically advanced and withdrawn through a wall of the boiler and is simultaneously rotated to position the end of the lance tube adjacent the bank of heat exchanger tubes to be cleaned. The end of the lance tube is provided with one or more nozzles which are used to project a stream of blowing medium such as steam, air, or water at high velocity against the heat exchanger tubes to dislodge and clean away the soot, ash, and slag deposits. The blowing medium impact produces mechanical and thermal shock which causes these adhering layers of soot, ash, and slag to fall away from the heat exchange surfaces. One major advantage of cleaning boilers with sootblowers is that the boilers do not need to be shut down in order to accomplish periodic cleaning of the fireside heat exchange surfaces, because cleaning is carried out while the boiler is in operation. At the conclusion of the cleaning cycle, the lance tube is retracted and withdrawn from the boiler to avoid exposure to the intense heat generated by the combustion of fuel which would distort and eventually destroy the lance tube.

Experience has shown that boiler tubes whose surfaces are subjected to impact by the high velocity and abrasive sootblower blowing medium suffer from erosion and wear. The problem of heat exchange surface deterioration has been particularly severe in connection with cleaning the rigidly held tube bundles such as those made up of horizontal boiler tubes found in large scale boilers. Since the horizontal tubes are rigidly held, they cannot readily distort in response to the temperature induced shrinkage and expansion occurring during a cleaning cycle. Difficulties are also present in an effort to produce adequate cleaning performance while avoiding thermal overstressing since the heat exchange tube surfaces to be cleaned are of varying distances from the lance tube nozzle and therefore a varying speed of blowing medium jet progression across the heat exchange surfaces occurs. Areas of slow progression may receive excessive quantities of sootblowing medium as compared with the amount required for effective cleaning. Thus, physical deterioration of the heat exchange tube surfaces may occur where the tubes are over-cleaned in this manner. Such degradation of the heat exchange tube surfaces of a boiler can produce catastrophic failures and a significant financial loss for the boiler operator.

The sootblowers which are designated for the cleaning of horizontal superheaters, reheaters and economizers are normally located at the top of each of the banks of these heat exchangers and positioned within an effective cleaning distance of the top horizontal tubes of each bank of tubes.

Accordingly, a protective device in the form of a shield is provided to prevent direct impingement of the boiler tube by the sootblower blowing medium while allowing the boiler tube to be cleaned of ash, slag, scale and other fouling deposits. The shield is normally comprised of an axially elongated member of arcuate cross section sized to fit over boiler tube side facing the sootblower so as to protect this side from the abrasive cleaning medium.

The described shield works well in protecting the boiler tubes from the high velocity and abrasive blowing medium, however, a problem with sootblower induced erosion has been experienced with tube shields located adjacent to anti-vibration bars. The problem occurs in the unprotected tube area existing between the adjacent end faces of the tube shield and the anti-vibration bar. Efforts at structurally bringing these end faces together and eliminating any gaps therebetween have met with failure due to the difference in thermal expansion of the tube shield relative to the protected tube at high boiler operating temperatures. Experience has shown that the gap existing between the adjacent end faces of the tube shield and the anti-vibration bar is one of the most vulnerable areas to sootblower induced erosion as a result of the flow disturbances created around the anti-vibration bar.

Referring to the prior art as illustrated in FIGS. 1 and 2, wherein like reference numerals denote like elements, there is shown an anti-vibration bar 11 straddling a bank of spaced horizontally oriented boiler tubes 13. The anti-vibration bar 11 is comprised of two elongated bars 15 holding the boiler tubes 13 therebetween. The two elongated bars 15 are drawn up to the boiler tubes 13 and fastened together by a cross-bar 17 which is welded to the elongated bars 15 at weld area 19, thereby suppressing tube vibrations that may occur during the operation of the boiler, not shown. Portions of the horizontal boiler tubes 13, located at the top of the tube bank, are fitted with arcuately shaped tube shields 21 for protection against the abrasive impingement of the fluid cleaning medium being ejected from the sootblower nozzles, not shown. The tube shields 21 are spaced from each other to accommodate the elongated bars 15 extending therebetween. The aforementioned problem has been encountered with this prior art arrangement due to the difference in thermal expansion of the tube shields 21 relative to the horizontal boiler tubes 13 at high boiler operating temperatures, that has resulted in the gaps 23 being formed between the adjacent ends of the tube shields 21 and the elongated bars 15 of the anti-vibration bar 11, thereby exposing a portion of the outer surface of boiler tubes 13 to the abrasive impact of the high velocity sootblower cleaning medium.

Accordingly, there is a need for an anti-vibration bar that will cooperate with the adjacent tube shields to insure that there are no boiler tube areas left unprotected from the abrasive impingement of the high velocity sootblower cleaning medium.

SUMMARY OF INVENTION

The present invention is directed to solving the aforementioned problem of boiler tube surface erosion at the gaps formed between the protective tube shields and adjacently located anti-vibration bars.

The present invention provides a structural framework referred to in the industry as an anti-vibration bar, and comprised of at least one pair of elongated parallel bars which straddle a bank of spaced horizontally oriented boiler tubes. The elongated bars are arranged transversely to the axial direction of the boiler tubes, and are connected by at least one cross-bar which acts to maintain the orientation of the elongated bars, and which draws the elongated bars up to the spaced boiler tubes to act as a lateral restraint to the tubes. The cross-bar is disposed perpendicular to the elongated bars. A cap fits over the front end of the elongated bars, and is welded to the elongated bars. Portions of the boiler tubes, located at the top of the bank, are fitted with sootblower erosion protective shields. In accordance with the present invention the cap is sized to overlap portions of the boiler tube and adjacent portions of the protective shields thereby covering any gaps that may occur between the protective shields and the anti-vibration bar as a result of the difference in their respective rates of thermal expansion at high boiler operating temperatures.

The various features of novelty which characterize the present invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
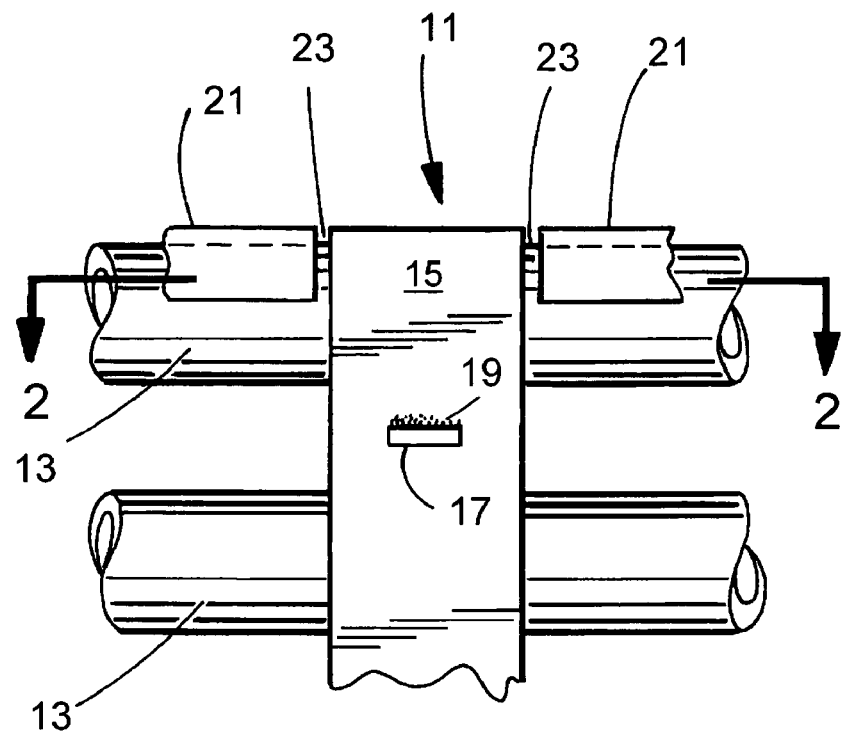
FIG. 1 is a fragmentary sectional side view of a known anti-vibration bar mounted on horizontal boiler tubes fitted with sootblower erosion protective shields, and illustrating the gap or spacing existing between the anti-vibration bar and the protective shields.
Figure 2:
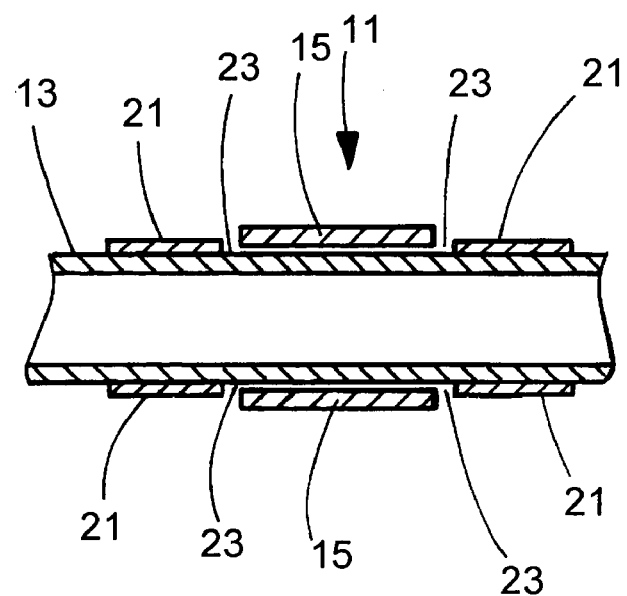
FIG. 2 is a fragmentary sectional view taken along lines 2-2 of FIG. 1, and illustrating the gap or spacing between the known anti-vibration bar and the protective shields.

Reference will hereinafter be made to the accompanying drawings wherein like reference numerals throughout the various figures denote like elements.

Figure 3:
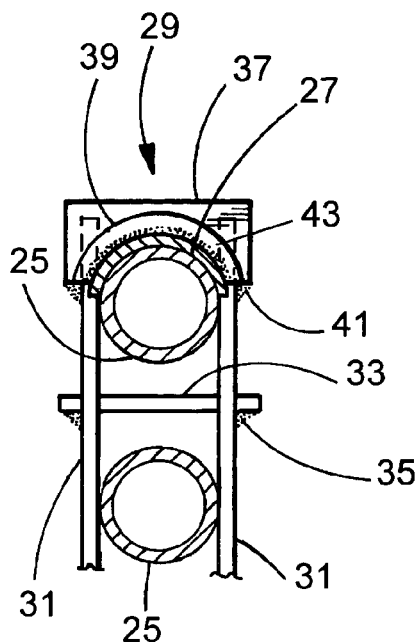
FIG. 3 is a fragmentary plan view of an anti-vibration bar embodying the present invention.
Figure 4:
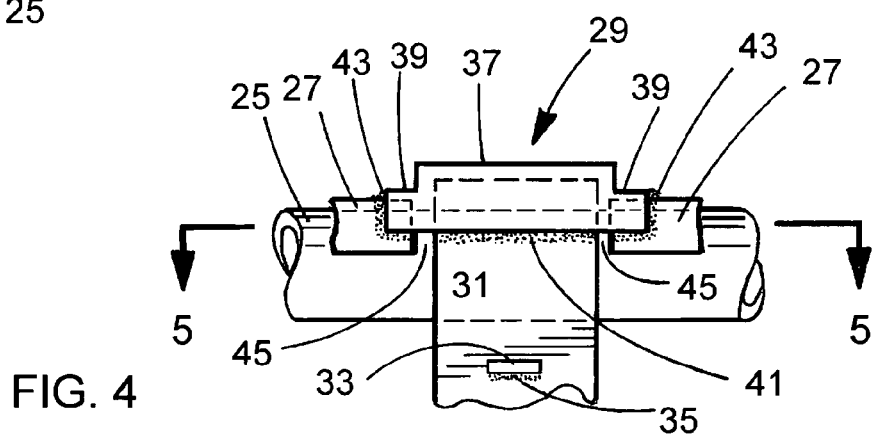
FIG. 4 is a fragmentary sectional side view of the anti-vibration bar of the present invention.
Figure 5:
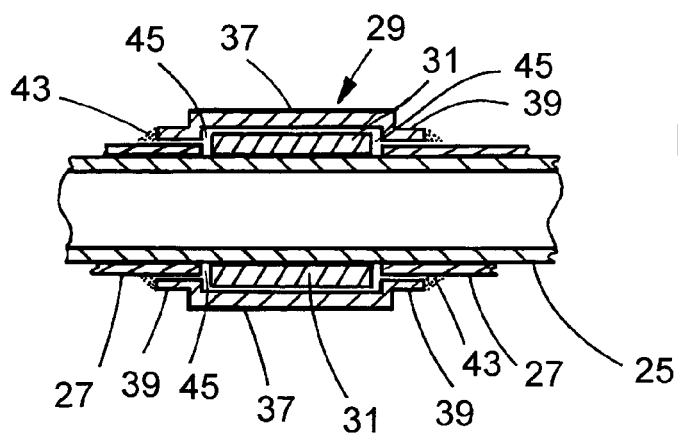
FIG. 5 is a fragmentary sectional view taken along lines 5-5 of the anti-vibration bar shown in FIG. 4.

Turning now to FIGS. 3, 4, and 5, which embody the present invention, there are shown a bank of horizontally oriented boiler tubes 25. Portions of the boiler tubes 25, located at the top of the bank, are fitted with arcuately shaped shields 27 for protection against the abrasive impingement of the fluid cleaning medium being ejected from the sootblower nozzles, not shown. The boiler tubes 25 are straddled by an anti-vibration bar 29 which is comprised of two elongated bars 31 arranged transversely to the axial direction of the boiler tubes 25. The elongated bars 31 are drawn up to the boiler tubes 25 and fastened together by at least one cross-bar 33 to act as a lateral restraint on the boiler tubes 25 and thereby suppress tube vibrations that may occur during the operation of the boiler, not shown. The elongated bars 31 and the cross-bar 33 are preferably flat, rectangular bars. The cross-bar 33 is disposed perpendicular to the elongated bars 31 in an H-shaped configuration, and is welded thereto as indicated at weld area 35. A cap 37 formed with shoulder segments 39 fits over the top end of the elongated bars 31, and is welded thereto at weld area 41. The shoulder segments 39 overlap the adjacent protective tube shields 27 as shown in FIGS. 4 and 5, and are welded to the protective shields 27 as indicated at weld area 43. Thus, in accordance with the present invention, the gaps 45 formed between the protective tube shields 27 and the elongated bars 31, as a result of the difference in the rates of thermal expansion during high boiler operating temperatures, and which would expose a portion of the outer surface of boiler tube 25 to sootblower induced erosion, are shielded by the overlapping shoulder segments 39 and the cap 37, thus eliminating the tube erosion problem faced by the prior art.

Although the present invention has been described above with reference to particular means, materials and embodiments, it is to be understood that this invention may be varied in many ways without departing from the spirit and scope thereof, and therefore is not limited to these disclosed particulars but extends instead to all equivalents within the scope of the following claims.

I claim:

1. A structural framework comprised of one pair of elongated bars, a tube portion disposed between the elongated bars, at least one shield fitted on the tube portion, a cap positioned at an end of the elongated bars, in which the cap is formed with at least one shoulder segment and the at least one shoulder segment is welded to the shield, the cap being sized to overlap the tube portion and an adjacent portion of the at least one shield.

2. The structural framework according to claim 1, in which the elongated bars extend in a direction transverse to the longitudinal axis of the tube portion.

3. The structural framework according to claim 1, including means for fastening the elongated bars together.

4. The structural framework according to claim 1, in which the cap is welded to at least one of the elongated bars.

5. A structural framework comprised of at least one pair of elongated bars, a tube portion disposed between the elongated bars, the tube portion having a side periodically subjected to the action of a stream of blowing fluid cleaning medium, spaced protective shields mounted on said side of the tube portion, means for fastening the elongated bars together, a cap positioned at an end of the elongated bars in which the cap is formed with shoulder segments and the shoulder segments are welded to the adjacent protective shield, the cap being sized to overlap the tube portion and adjacent portions of the protective shields thereby covering any gaps exposing said side of the tube portion to the action of the fluid cleaning medium.

6. The structural framework according to claim 5, in which the elongated bars extend in a direction transverse to the longitudinal axis of the tube portion.

7. The structural framework according to claim 5, in which the cap is welded to at least one of the elongated bars.

* * * * *